United States Patent [19]

Throckmorton

[11] 4,452,960

[45] Jun. 5, 1984

[54] PROCESS FOR NONAQUEOUS DISPERSION POLYMERIZATION OF BUTADIENE IN THE PRESENCE OF POLYMERIC DISPERSING AGENTS

[75] Inventor: Morford C. Throckmorton, Akron, Ohio

[73] Assignee: The Goodyear Tire & Rubber Company, Akron, Ohio

[21] Appl. No.: 420,065

[22] Filed: Sep. 20, 1982

[51] Int. Cl.$^3$ ............................................. C08F 2/08
[52] U.S. Cl. .................................................. 526/201
[58] Field of Search ............... 526/201, 202, 203, 208, 526/340.4

[56] References Cited

U.S. PATENT DOCUMENTS 3,644,585 2/1972 Takayanagi ...................... 526/340.4
4,098,980 7/1978 Markle ................................. 526/201

*Primary Examiner*—Paul R. Michl

*Attorney, Agent, or Firm*—Alvin T. Rockhill

[57] ABSTRACT

This invention discloses a process for the nonaqueous dispersion polymerization of butadiene monomer in a reaction mixture containing a liquid nonaqueous dispersion medium, the improvement which comprises carrying out the polymerization of the butadiene monomer in the presence of at least one member selected from the group consisting of cis-1,4-poly(1,3-pentadiene), trans-1,4-poly(1,3-pentadiene), trans-1,2-poly(1,3-pentadiene), moderately high trans-1,4-polyisoprene, poly(2,3-dimethyl-1,3-butadiene), syndiotactic 1,2-polybutadiene, atactic 1,2-polybutadiene, butadiene/isoprene copolymers, butadiene/dimethylbutadiene/pentadiene terpolymers, styrene/1,3-pentadiene copolymers, mixtures of from 20% to 65% 3,4-polyisoprene and from 35% to 80% 1,4-polyisoprene, EPDM rubbers, and butyl rubbers to produce very high cis-1,4-polybutadiene.

16 Claims, No Drawings

PROCESS FOR NONAQUEOUS DISPERSION POLYMERIZATION OF BUTADIENE IN THE PRESENCE OF POLYMERIC DISPERSING AGENTS

BACKGROUND OF THE INVENTION

Many polymerization processes are used in the formation of synthetic polymers. For example, the polymerization of a polymer can be conducted in a number of different types of reaction systems, including bulk polymerization, suspension polymerization, emulsion polymerization, and solution polymerization. Each of these systems has certain advantages and disadvantages.

Bulk polymerization is the direct conversion of liquid monomers to polymer in a reaction system in which the polymer remains soluble in its own monomer. Such bulk polymerizations are generally carried out by the addition of an initiator to a simple homogeneous system containing one or more monomers. The synthesis of polystyrene by the addition of a free radical initiator to styrene monomer is a good example of a very common bulk polymerization. The principal advantage of a bulk polymerization process is that the product obtained can be used directly since it is essentially free of solvents and impurities. One disadvantage of bulk polymerization reactions is that it is difficult to control the reaction temperature during polymerization.

In suspension polymerization, the initiator is dissolved in the monomer, the monomer is dispersed in water, and a dispersing agent is incorporated to stabilize the suspension formed. All suspension polymerization processes use some type of surfactant to keep the monomer globules dispersed during the reaction in order to avoid coalescence and agglomeration of the polymer. Not only does the suspension stabilizer affect the particle size and shape, but also the clarity, transparency and film-forming properties of the resultant polymer. A variety of dispersing agents including water-insoluble, finely divided, inorganic materials and organic materials, depending upon the monomer to be polymerized, have been used as dispersing agents. Thus, for example, talc, barium calcium and magnesium carbonates, silicates, phosphates and sulfates, as well as poly(vinyl alcohol), tragacanth gum, salts of styrene-maleic anhydride copolymers, vinyl acetate-maleic anhydride copolymers and their salts, starch, gelatin, pectin, alginates, methyl cellulose, carboxymethyl-cellulose, bentonite, limestone and alumina have been used as suspending agents. A major advantage of suspension polymerization is that the polymeric products are obtained in the form of small beads which are easily filtered, washed and dried. For reasons of cost and unreactivity, water is a much more desirable diluent and heat-transfer medium than most organic solvents.

However, in certain polymerization processes, for example, the preparation of very high cis-1,4-polybutadiene, while utilizing nickel catalyst systems the presence of any moisture is highly undesirable. Thus, suspension polymerization in a water medium is not an effective process for the synthesis of very high cis-1,4-polybutadiene utilizing nickel catalyst systems.

An emulsion polymerization process is considered to be a three-phase reaction system consisting of large droplets of the monomer, the aqueous phase containing the dissolved initiator, and the colloidal particles of monomer-swollen polymer. While the emulsion polymerization process has the economic advantage of using water as the emulsion base, not all polymerization processes can tolerate the presence of water.

Such is the case with the polymerization of butadiene into very high cis-1,4-polybutadiene utilizing nickel catalyst systems.

In solution polymerization, an organic solvent is used which is capable of dissolving the monomer, the polymer and the polymerization catalyst or initiator. Inasmuch as the polymer is soluble in the organic solvent which is used, there is a tendency for the viscosity of the solution to increase as the molecular weight of the polymer increases. If this continues over a period of time, the solution becomes too viscous to handle in conventional polymerization reaction systems unless the solids content is limited to a low level. In commercial polymerization processes, it is desirable to obtain a polymerization mass which has a high concentration of solid polymer and, at the same time, comprises a material which is easy to handle and does not agglomerate on the walls of the reaction vessel.

A process for the nonaqueous dispersion polymerization of butadiene monomer into a very high cis-1,4-polybutadiene would be very desirable. Such a nonaqueous dispersion polymerization process could offer several distinct advantages over other possible polymerization techniques, including improved heat transfer, higher polymer concentrations in the reaction medium, increased production capacity, and energy saving.

A process for the nonaqueous dispersion polymerization of butadiene monomer in a liquid nonaqueous dispersion medium, for instance, n-butane or n-pentane with a Ziegler-Natta catalyst which utilizes a block copolymer dispersion stabilizer is described in U.S. Pat. No. 4,098,980 to Richard A. Markle and Richard G. Sinclair (assigned to The Goodyear Tire & Rubber Company). This reference is hereby incorporated by reference in its entirety. The block copolymer dispersion stabilizer utilized in U.S. Pat. No. 4,098,980 is a copolymer which contains at least two blocks of polymer linked by chemical valences, at least one block (A block) is soluble in liquid organic dispersion medium and at least another block (B block) is insoluble in the dispersion medium and the stabilizer acts to disperse the polybutadiene which is formed in the stabilizer's presence.

SUMMARY OF THE INVENTION

In accordance with the present invention, a process is provided for the nonaqueous dispersion polymerization of butadiene monomer in a liquid nonaqueous dispersion medium utilizing at least one member selected from the group consisting of cis-1,4-poly(1,3-pentadiene), trans-1,4-poly(1,3-pentadiene), trans-1,2-poly(1,3-pentadiene), moderately high trans-1,4-polyisoprene, poly(2,3-dimethyl-1,3-butadiene), syndiotactic 1,2-polybutadiene, atactic 1,2-polybutadiene, butadiene/isoprene copolymers, butadiene/dimethylbutadiene/pentadiene terpolymers, styrene/1,3-pentadiene copolymers, mixtures of from 20% to 65% 3,4-polyisoprene and from 35% to 80% 1,4-polyisoprene, EPDM rubbers, and butyl rubbers as the dispersion stabilizer (dispersing agent) to produce very high cis-1,4-polybutadiene.

The butadiene monomer is polymerized to very high cis-1,4-polybutadiene (95% or more cis-1,4-isomeric butadiene units) in a nonaqueous medium in which the very high cis-1,4-polybutadiene is essentially insoluble.

Some representative examples from which this medium can be selected include n-butane, isobutane, n-pentane, isopentane, neopentane, and isobutylene, and mixtures or combinations of any or all of these hydrocarbons. Standard nickel catalyst systems for the synthesis of very high cis-1,4-polybutadiene can be used in this polymerization technique.

This invention discloses a process for the nonaqueous dispersion polymerization of butadiene monomer in a reaction mixture containing a liquid nonaqueous dispersion medium, the improvement which comprises carrying out the polymerization of the butadiene monomer in the presence of at least one member selected from the group consisting of cis-1,4-poly(1,3-pentadiene), trans-1,4-poly(1,3-pentadiene), trans-1,2-poly(1,3-pentadiene), moderately high trans-1,4-polyisoprene, poly(2,3-dimethyl-1,3-butadiene), syndiotactic 1,2-polybutadiene, atactic 1,2-polybutadiene, butadiene/isoprene copolymers, butadiene/dimethylbutadiene/pentadiene terpolymers, styrene/1,3-pentadiene copolymers, mixtures of from 20% to 65% 3,4-polyisoprene and from 35% to 80% 1,4-polyisoprene, EPDM rubbers, and butyl rubbers to produce very high cis-1,4-polybutadiene.

DETAILED DESCRIPTION

Butadiene can be polymerized to a very high (95% or greater) cis-1,4-polybutadiene in a nonaqueous liquid dispersion medium containing at least one member selected from the group consisting of cis-1,4-poly(1,3-pentadiene), trans-1,4-poly(1,3-pentadiene), trans-1,2-poly(1,3-pentadiene), moderately high trans-1,4-polyisoprene, poly(2,3-dimethyl-1,3-butadiene), syndiotactic 1,2-polybutadiene, atactic 1,2-polybutadiene, butadiene/isoprene copolymers, butadiene/dimethylbutadiene/pentadiene terpolymers, styrene/1,3-pentadiene copolymers, mixtures of from 20% to 65% 3,4-polyisoprene and from 35% to 80% 1,4-polyisoprene, EPDM rubbers, and butyl rubbers to produce very high cis-1,4-polybutadiene. The nonaqueous medium in which this polymerization is run must be a very poor solvent for very high cis-1,4-polybutadiene. Some representative examples of nonaqueous media that can be employed in which the very high cis-1,4-polybutadiene is essentially insoluble include: n-butane, isobutane, n-pentane, isopentane, neopentane, 2-methylpentane, 2,2-dimethylbutane, 2,2-dimethylpentane, 2,4-dimethylpentane, 2,2,4-trimethylpentane, 2,2,3-trimethylbutane, isobutylene, 1-butene, 3-methyl-1-butene, trans-2-butene and any mixture of any or all of these nonaqueous media. Minor amounts of other hydrocarbons, which by themselves are solvents for very high cis-1,4-polybutadiene, can also be present in such a nonaqueous dispersion media; however, their presence is detrimental since even small amounts of solvent will cause swelling of the cis-1,4-polybutadiene and result in an increase in viscosity. The presence of large amounts of solvents for cis-1,4-polybutadiene will lead to the formation of a cement-like composition. Since it is desirable for these nonaqueous dispersions to have a very low viscosity it is advantageous to minimize the amount of solvents for cis-1,4-polybutadiene in the nonaqueous medium.

The liquid nonaqueous dispersion media should contain less than about 5% aromatic and cycloaliphatic hydrocarbons (which are good solvents for cis-1,4-polybutadiene) such as, benzene, toluene, cyclohexane, methylcyclohexane and the like. The nonaqueous medium must contain less than about 20% aliphatic hydrocarbons that are fair solvents for high cis-1,4-polybutadiene in order to be effective as a nonaqueous medium in the polymerization of high cis-1,4-polybutadiene. Some representative examples of such aliphatic hydrocarbons include: hexane, 3-methylpentane, 2,3-dimethylbutane, heptane, octane, 2,3-dimethylpentane, and 2,3,4-trimethylpentane.

Most olefins react too rapidly with the alkylaluminum catalysts that can be used in these polymerizations and/or are too good as solvents for the very high cis-1,4-polybutadiene to be useful as a nonaqueous dispersion media. Some olefins that are exceptions to this general rule include trans-2-butene, isobutylene, 1-butene and 3-methyl-1-butene which can be used with good success as nonaqueous dispersion media. Fluorohydrocarbons can also be used very successfully as the nonaqueous dispersion media for the synthesis of very high cis-1,4-polybutadiene. Some representative examples of fluorohydrocarbons that can be employed as the nonaqueous dispersion media include 1,1,1,2,2-pentafluoropropane, decafluorobutane, octafluorobutane and the like.

Several factors are important in selecting the preferred medium for the nonaqueous dispersion polymerization of very high cis-1,4-polybutadiene. If the medium has a very low boiling point, it is necessary to operate the system at a relatively high pressure and/or while utilizing considerable refrigeration. If the medium has a relatively high boiling point, more energy is required to recover and/or remove the last traces of the medium from the polymer. Other things being equal, the dispersed particles will stay dispersed or suspended slightly better in a high density medium than it will in a medium having a relatively low density. One of the most important factors in selection of a preferred nonaqueous medium is the relative solvency of the medium for the very high cis-1,4-polybutadiene and for the dispersing agent.

The relative solvency factor is related to the solubility parameter, which is the square root of the cohesive energy density, that is, $$\text{Solubility parameter} = \sqrt{\frac{\Delta E}{V}}$$

where E is internal energy and V is the molar volume. A good medium in which to conduct nonaqueous polymerization of butadiene to very high cis-1,4-polybutadiene should have a solubility parameter between about 6 and about 7 (cal/cc)$^{\frac{1}{2}}$. The solubility parameter values are as reported by Kenneth L. Hoy in "New Values of the Solubility Parameters From Vapor Pressure Data." *Journal of Paint Technology*, vol. 42, no. 541, pp. 76–118 (1970). This article is incorporated herein by reference in its entirety.

The preferred media are n-butane, n-pentane, isopentane, 2-methylpentane, 2,2-dimethylpentane, 2,2,4-trimethylpentane, and any mixtures of two or more of these media.

It is essential to employ at least one member selected from the group consisting of cis-1,4-poly(1,3-pentadiene), trans-1,4-poly(1,3-pentadiene), trans-1,2-poly(1,3-pentadiene), moderately high trans-1,4-polyisoprene, poly(2,3-dimethyl-1,3-butadiene), syndiotactic 1,2-polybutadiene, atactic 1,2-polybutadiene, butadiene/isoprene copolymers, butadiene/dimethylbutadiene/pentadiene terpolymers, styrene/1,3-pentadiene copolymers, mixtures of from 20% to 65% 3,4-polyisoprene and from 35% to 80% 1,4-polyisoprene, EPDM rubbers, and butyl rubbers to produce very high cis-1,4-polybutadiene as a dispersing agent in this nonaqueous polymerization of butadiene into very high cis-1,4-polybutadiene. The amount of moderately high trans-1,4-polyisoprene, syndiotactic 1,2-polybutadiene, atactic 1,2-polybutadiene, moderately high trans-1,4-polyisoprene, EPDM rubbers, and butyl rubbers which must be present in order to produce nonaqueous dispersions for very high cis-1,4-polybutadiene can range between about 2.5 and about 15 parts by weight per 100 parts of butadiene monomer (phm) used in the polymerization. The preferred range for the amount of moderately high trans-1,4-polyisoprene, syndiotactic 1,2-polybutadiene, atactic 1,2-polybutadiene, moderately high trans-1,4-polyisoprene, EPDM rubbers, and butyl rubbers which can be employed is between 5 and 10 phm. When any of the other dispersing agents of this invention are employed the amount required in order to produce nonaqueous dispersions for very high cis-1,4-polybutadiene ranges between about 0.5 and about 15 phm. The preferred range for these dispersing agents is between 1.5 and 5 phm.

In moderately high trans-1,4-polyisoprene between 50% and 80% of the isoprene units in the polymer have the trans-1,4-isomeric structure. The remaining isoprene units in the polymer can be atactic or have the cis-1,4-isomeric structure. If over 90% of the isoprene units in the polymer have the trans-1,4-isomeric structure it will be insoluble in the nonaqueous dispersion medium and unsatisfactory as a dispersing agent. If 80% to 90% of the isoprene units in the polymer have the trans-1,4-isomeric structure it will be only marginally soluble in the nonaqueous dispersion medium and of very limited value as a nonaqueous dispersing agent.

The mixtures of 3,4-polyisoprene and 1,4-polyisoprene that are useful as dispersing agents must contain between 20% and 65% 3,4-polyisoprene and between 35% and 80% 1,4-polyisoprene. The 1,4-polyisoprene in such mixtures can be atactic, or it can have either a cis- or trans-1,4-isomeric structure. The 1,4-polyisoprene component in such mixtures can have any combination of mixed microstructures. It is generally preferred for these mixtures of 3,4-polyisoprene and 1,4-polyisoprene to contain about 50% 3,4-polyisoprene and about 50% 1,4-polyisoprene. Cis-1,4-poly(1,3-pentadiene), trans-1,4-poly(1,3-pentadiene), and trans-1,2-poly(1,3-pentadiene) can all be used as polymeric dispersing agents for very high cis-1,4-polybutadiene. The poly(2,3-dimethyl-1,3-butadiene) that is useful as a dispersing agent in this invention should be atactic, as found in polymers which have a random mixture of microstructures. Either syndiotactic or atactic 1,2-polybutadiene can be used as the polymeric dispersing agent in this invention.

Butadiene-isoprene copolymers, butadiene-dimethylbutadiene-pentadiene terpolymers, and styrene-1,3-pentadiene copolymers can also be used as dispersing agents in these polymerizations. The microstructure of these copolymers and terpolymers is not of importance. The copolymers of styrene and 1,3-pentadiene that are useful as polymeric dispersing agents have 0 to 50% of their repeat units being derived from styrene. It is preferred for these copolymers to have from 10% to 30% of their repeat units being derived from styrene.

The butadiene/isoprene copolymers and butadiene/dimethylbutadiene/pentadiene terpolymers that are useful as polymeric dispersing agents in this invention can have any ratio of repeat units being derived from these different monomers. However, a significant amount (about 5% or more) of repeat units by weight must be derived from each of the different monomer components of the polymer.

The EPDM rubbers that are useful in this invention include: ethylene/propylene/dicyclopentadiene terpolymers, ethylene/propylene/ethylidene norbornene terpolymers, ethylene/propylene/methylene norbornene terpolymers, ethylene/propylene/1,4-hexadiene terpolymers, ethylene/propylene/5-methyl-1,4-hexadiene terpolymers, ethylene/propylene/vinyl norbornene terpolymers, ethylene/propylene/1,4,9-decatriene terpolymers, and the like. In such EPDM rubbers between about 1.5% and 15% by weight of the repeat units are unsaturated (derived from nonconjugated diolefins). From about 40% to 70% by weight of the polymer's repeat units are derived from ethylene and about 30% to 70% by weight of the polymers repeat units are derived from propylene in such EPDM rubbers. It is preferred for 2.5% to 8% by weight of the repeat units to be unsaturated, for 45 to 55% by weight of the repeat units to be derived from ethylene, and for 35% to 50% by weight of the repeat units to be derived from propylene.

The butyl rubbers that can be employed as polymeric dispersing agents include: isoprene/isobutylene copolymers, isoprene/isoamylene copolymers, butadiene/isobutylene copolymers, and the like. These polymers are generally comprised of about 80% to 99% by weight of the olefinic component while the remaining portion of the copolymer is comprised of the conjugated diolefinic component. It is preferred for such butyl rubbers to be comprised of 95% to 99% by weight of the olefinic component and 1% to 5% by weight of the conjugated diolefinic component.

The polymeric dispersing agents that are preferred for use in this invention have number average molecular weights ranging from about 50,000 to about 1,000,000. Polymers with number average molecular weights of over 1,000,000 can generally also be employed but normally their solubility in the nonaqueous dispersion medium is not as good.

The polymeric dispersing agents that are preferred for use in this invention include: mixtures of 3,4-polyisoprene and 1,4-polyisoprene; cis-1,4-poly(1,3-pentadiene); and trans-1,3-poly(1,3-pentadiene). The most preferred dispersing agents are 3,4-polyisoprene/1,4-polyisoprene mixtures and trans-1,2-poly(1,3-pentadiene).

Insignificant amounts (about 5% or less by weight) of other monomers can also be copolymerized into the polymeric dispersing agents described in this invention without totally losing the usefulness of these polymers as nonaqueous dispersing agents for very high cis-1,4-polybutadiene. For example, a terpolymer of butadiene, isoprene, and 2-ethyl-(1,2-butadiene) containing only an insignificant amount of repeat units derived from 2-ethyl-(1,3-butadiene) and which contains predominantly repeat units derived from butadiene and isoprene will be useful as a dispersing agent in this invention. The polymeric dispersing agents described in this invention can generally also be mildly halogenated and will still be useful in such polymerizations of butadiene into a very high cis-1,4-polybutadiene.

The reaction mixture utilized in the nonaqueous dispersion polymerization of butadiene to produce a very high cis-1,4-polybutadiene is comprised of a liquid nonaqueous dispersion medium, a dispersing agent butadiene monomer, and a catalyst system. Such a polymerization can be run over a temperature range from 0° up to 100° C. Most generally, it is preferred to utilize a reaction temperature from 35° C. to 70° C. The reaction time required in such a polymerization will vary with the reaction temperature utilized, catalyst system, and catalyst level. Generally, this reaction time will vary from about 20 minutes up to about 30 hours. Commonly, it will be preferred to utilize a reaction time from about 1 up to about 6 hours.

The amount of butadiene monomer that can be utilized in such a nonaqueous dispersion polymerization reaction mixture can be varied from about 3 to about 30 weight percent based upon the total reaction mixture. It is preferred to have a concentration of butadiene monomer ranging from 10 to 25 percent by weight based upon the total reaction mixture.

It is desirable to conduct this polymerization in an oxygen and moisture free environment. For example, it is desirable to sparge the reaction mixture with dry nitrogen and to run the polymerization under a dry nitrogen atmosphere. The pressure in the reaction system during the polymerization generally will be a function of the polymerization temperature, the butadiene monomer concentration, and the boiling point of nonaqueous dispersion medium. This polymerization pressure will usually be within the range between 100,000 Pa (Pascal) and 500,000 Pa.

The catalyst systems used in this nonaqueous dispersion polymerization to prepare very high cis-1,4-polybutadiene are ternary systems comprised of an organoaluminum compound, a soluble nickel containing compound, and a fluorine containing compound. The organoaluminum compound used is usually a trialkylaluminum; a dialkylaluminum hydride, or a dialkylaluminum fluoride. The preferred organoaluminum compounds include triethylaluminum (TEAL), tri-n-propylaluminum, triisobutylaluminum (TIBAL), trihexylaluminum, disisobutylaluminum hydride (DIBA-H), and diethylaluminum fluoride. Some representative examples of organonickel compounds that can be utilized include nickel benzoate, nickel naphthenate, nickel 2-ethylhexanoate, which is commonly referred to as nickel octanoate or nickel octanoate (NiOct), nickel neo-decanoate, nickel acetylacetonate, and nickel salicylaldehyde. Some representative examples of fluorine containing compounds that can be utilized include boron trifluoride ($BF_3$), hydrogen fluoride, boron trifluoride diethyl etherate complex, boron trifluoride di-n-butyl etherate complex, boron trifluoride phenolate complex, boron trifluoride benzaldehyde complex, boron trifluoride ethyl benzoate complex, hydrogen fluoride diethylether complex, and hydrogen fluoride di-n-butyl ether complex.

The catalysts and the procedure for preparing very high cis-1,4-polybutadiene while utilizing nickel catalyst systems are described in U.S. Pat. Nos. 3,170,907, 3,483,177, 3,856,764. All of the foregoing references are hereby incorporated by reference in their entirety. The catalyst components can be charged "in situ," premixed in the absence of any monomer, "preformed" by premixing in the presence of a minor amount of butadiene monomer, or premixed in the presence of certain polymers such as polybutadiene.

This nonaqueous dispersion polymerization can be run by simply adding the catalyst components to a nonaqueous dispersion medium which contains butadiene monomer and the polymeric dispersing agent to form the reaction mixture. In a continuous polymerization process, all components are added simultaneously. During the course of the polymerization it will generally be desirable to provide some form of agitation to the reaction mixture, such as stirring, shaking, or tumbling. A shortstopping agent may be employed to terminate the polymerization after the desired reaction time or at the desired percent conversion of monomer to polymer. Antioxidants can also be added to these nonaqueous dispersions of very high cis-1,4-polybutadiene.

The nonaqueous dispersions formed in this polymerization process may have concentrations of very high cis-1,4-polybutadiene ranging between about 14 and 20 weight percent which are quite fluid and permit greatly improved heat transfer in comparison to that occurring with the very viscous, highly swollen polybutadiene cement of similar concentrations produced when using solution polymerization techniques. Due to the relative fluidity of these nonaqueous dispersions, the concentration of dispersed very high cis-1,4-polybutadiene in the medium can be increased by 25 to 60% over the maximum allowable concentrations in solution polymerization techniques. Thus, polymer concentrations prepared by the nonaqueous polymerization procedure may range between about 25 and about 35 weight percent. This is achieved while maintaining adequate fluidity and heat transfer. Therefore, the production capacity of a given polymerization reactor can be greatly increased. The viscosity of the nonaqueous dispersion will increase sharply as the concentration of very high cis-1,4-polybutadiene in the dispersion increases.

A further advantage of using this nonaqueous dispersion polymerization technique is that the polymerization medium can be recovered and used directly for further polymerizations without the usual steam stripping, distillation, and drying since the dispersed particles can be removed by centrifuging, sedimentation or filtration.

For example, a nonaqueous dispersion can be mixed with about 1 phr of di-tertiary-butyl-p-cresol and a trace of methanol (0.1 to 0.5% by weight) and then charged into a rotary drum vacuum filter where the bulk of the liquid nonaqueous dispersion medium can be removed and pumped to a premix makeup tank where fresh butadiene can be added for utilization in further polymerizations. The filter cake of very high cis-1,4-polybutadiene can then be removed mechanically and/or by using a reverse flow of an inert gas or nitrogen to help dislodge the polymer from the filter cloth. The drying of the filter cake can be completed by passing it through a tunnel dryer or an expeller and extruder dryer.

An alternative method of recovering the solid high cis-1,4-polybutadiene from the nonaqueous dispersion medium is by centrifuging. For example, an automatic batch centrifuge can be employed. Separation by sedimentation followed by removal (pumping off) of the supernatant liquid can also be used. However, this is generally a much slower and less effective process.

A portion of the liquid nonaqueous dispersion medium from either the filtration, centrifucation or sedimentation operations will generally have to be distilled in a fractionating column before it is returned to the premix makeup tank for use in additional polymerizations. This is in order to prevent buildup of excessive amounts of impurities in the recycled dispersion medium. Distillation of 15 to 25% by weight of the recycle medium normally will suffice although the amount will depend upon operating conditions.

Such a nonaqueous dispersion can also be processed in a manner similar to that customarily utilized in solution polymerization techniques, where the "cement" is mixed with water and steam which coagulate the polymer and vaporize the solvent and unreacted monomer. This is a very energy intensive process wherein water is emoved from the "crumb" rubber in a dewatering tank and trough, a water expeller, and an extruder dryer. Several other variations in centrifuging, filtration and sedimentation operations are described by W. L. McCabe and J. C. Smith in *Unit Operations of Chemical Engineering*, Third Edition, McGraw-Hill Chemical Engineering Series, Chapter 30, pages 922–972 (1976). This article is incorporated herein by reference in its entirety.

DESCRIPTION OF THE PREFERRED EMBODIMENTS

This invention is illustrated by the following examples which are merely for the purpose of illustration and are not to be regarded as limiting the scope of the invention or manner in which it may be practiced. Unless specifically indicated otherwise, parts and percentages are given by weight. Inherent viscosities were determined at a concentration of 0.5 weight percent in toluene at 30° C.

Brookfield viscosities for the dispersions were determined at 25° C. using a Brookfield viscometer, Model LVF manufactured by Brookfield Laboratories, Inc. The very high cis-1,4-polybutadiene samples were separated from the nonaqueous mediums by air drying on drying trays followed by vacuum drying to constant weight (unless indicated otherwise).

The dispersions have been rated arbitrarily according to their relative appearance, that is, how well the polymer particles stay suspended and dispersed in the polymerization medium. The ratings expressed in a descending order of relative quality are; Excellent>Fine>Very Good>Good>Fair>Poor> not a NAD (nonaqueous dispersion).

EXAMPLES 1 THROUGH 6

A solution of butadiene in n-pentane was prepared and passed down a column containing silica gel. Measured quantities of this solution were charged into a series four ounce (118 ml) bottles. These solutions were well sparged with dry nitrogen after which time they contained about 9 grams of butadiene per 100 milliliters of solution (the solution contained 14.4 weight percent butadiene).

Various homopolymers of conjugated diolefins were added to these solutions as dispersing agents, 2 or 2.5 parts per hundred parts of butadiene monomer of five different conjugated diolefins were added individually to the butadiene solutions previously prepared. No conjugated diolefin was added to one bottle which served as a control. The composition of the five conjugated diolefins used as dispersing agents as determined by infrared and nuclear magnetic resonance spectrometry and their inherent viscosities are given in Table I.

TABLE I

| Example | Polymer | Microstructure | DSV,dl/g |
|---|---|---|---|
| 2 | 3,4-/1,4-PI | 50% cis-1,4, 50% 3,4- | 10,0 |
| 3 | cis-1,4-PPD | 88% cis-1,4-, 12% trans-1,2- | 4.8 |
| 4 | cis-1,4-PPD | 75% cis-1,4-, 21% trans-1,2-, 4% 3,4- | 2.7 |
| 5 | trans-1,4-PPD | 85% trans-1,4-, 11% cis-1,2-, 4% 3,4- | 3.7 |
| 6 | trans-1,2-PPD | 87% trans-1,2-, 9% cis-1,4-, 4% 3,4- | 5.1 |

PI = polyisoprene
PPD = poly(1,3-pentadiene)

Catalysts were added to these butadiene in n-pentane solutions containing the various conjugated diolefins by utilizing an "in situ" technique. In order to start the polymerizations the catalyst components were added to each of these solutions in the order triethylaluminum (TEAL), nickel octanoate (NiOct) and boron trifluoride.diethylether complex (BF$_3$.Et$_2$O). The TEAL and NiOct added were previously dissolved in n-pentane and the BF$_3$.Et$_2$O was previously dissolved in benzene. The amount of these catalyst components charged into the reaction solutions was 1.0 millimole of TEAL, 0.1 millimole of NiOct, and 1.5 millimoles of BF$_3$.Et$_2$O per 100 grams of butadiene monomer (mhm). The bottles were tightly capped and rotated end-over-end in a water bath at 50° C. for the length of time shown in Table II.

The very high cis- 1,4-polybutadiene produced in these polymerizations was essentially insoluble in n-pentane. This is exemplified by the fact that in the control that contained no dispersing agent the very high cis-1,4-polybutadiene plated out, coated the inside of the glass bottle, and coalesced to form sticky balls within the reaction solution.

The contents of all of the other bottles which did contain the various poly conjugated diolefin dispersing agents shown in Table II became milk-colored after about 20 minutes at 50° C. and remained very fluid. Excellent nonaqueous dispersions were obtained in the presence of both the 3,4-polyisoprene/1,4-polyisoprene mixture and the trans 1,2-polypentadiene polymers.

Good dispersions were obtained using the other conjugated diolefin dispersing agents, but a buildup of a few polymer particles was observed on the inside of the glass bottles. These polymerizations were terminated by adding one part per hundred parts of monomer (phm) of both a rosin acid and and an antioxidant to the dispersions. Excellent polymer yields were obtained and are reported in Table II. These polymeric dispersing agents apparently did not affect the dilute solution viscosity (DSV) of the dried polymers that were synthesized since they all were found to have DSV's equal to 3.5±0.2 dl/g.

These examples show that certain homopolymers of conjugated diolefins have excellent properties as dispersing agents in the polymerization of high cis-1,4-polybutadiene. Yields of 98 percent and dispersions with an excellent appearance were obtained using both the 3,4/1,4-polyisoprene mixture and the trans 1,2-polypentadiene polymers.

TABLE II

| Example | Dispersant, | Parts/ 100g Bd | Pzn Time, Hours | Polymer Yield, wt % | DSV, dl/g | Dispersion Appearance |
|---|---|---|---|---|---|---|
| 1 | None (Control) | 0 | 23 | 96 | 3.7 | Plated out and balls; not a dispersion |
| 2 | 50/50 3,4-/1,4-PI | 2.0 | 26 | 98 | 3.4 | Excellent |
| 3 | 88% cis-1,4-PPD | 2.5 | 20 | 96 | 3.5 | Very good |
| 4 | 75% cis-1,4-PPD | 2.5 | 19 | 94 | 3.3 | Good |
| 5 | 85% trans-1,4-PPD | 2.5 | 24 | 89 | 3.7 | Good |
| 6 | 87% trans-1,2-PPD | 2.5 | 18 | 98 | 3.6 | Excellent |

PI = polyisoprene
PPD = poly(1,3-pentadiene)

EXAMPLES 7 THROUGH 17

TABLE III

| Example | Dispersant, | phm | Dispersion Appearance | Polymerization Time (hours) | Vol % Clear Liquid after 3 days | Redisperses | DSV dl/g |
|---|---|---|---|---|---|---|---|
| 7 | None | 0 | Plated out | 23 | 68 | No | 3.7 |
| 8 | 88% cis-1,4-PPD | 1.0 | Fair | 25 | ND | No | 3.5 |
| 9 | 88% cis-1,4-PPD | 2.5 | Very good | 20 | 55 | Yes | ND |
| 10 | 88% cis-1,4-PPD | 5.0 | Excellent | 25 | 21 | Yes | 3.4 |
| 11 | trans-1,2-PPD | 1.0 | Good | 18 | 57 | Yes | 3.3 |
| 12 | trans-1,2-PPD | 1.0 | Excellent | 18 | 32 | Yes | 3.6 |
| 13 | trans-1,2-PPD | 5.0 | Excellent | 18 | 5 | Yes | 3.9 |
| 14 | 3,4-/1,4-PI | 1.0 | Good | 26 | 54 | Yes | 3.4 |
| 15 | 3,4-/1,4-PI | 2.0 | Excellent | 26 | 39 | Yes | 3.4 |
| 16 | 3,4-/1,4-PI | 3.5 | Excellent | 26 | 38 | Yes | ND |
| 17 | 3,4-/1,4-PI | 2.0$^a$ | Excellent | 20 | 34 | Yes | 3.1 |

PPD — poly(1,3-pentadiene)
PI — polyisoprene
ND — Not determined
a - catalyst charge was increased to TEAL:NiOct.BF$_3$ = 2:0.3:3 mhm Butadiene was polymerized using the technique described in Examples 1 through 6 except that different amounts of the polymeric dispersing agents were added in this series of Examples to investigate the effect of the concentration of the polymeric dispersing agent upon the nonaqueous dispersion formed. These polymerizations were allowed to run for the period shown in Table III. The resulting dispersion of high cis-1,4-polybutadiene was permitted to stand on the laboratory bench for 3 days without agitation. Observations were then made and are listed in Table III. The amount of polybutadiene in these dispersions ranged between about 12 to 14 weight percent. These polymerizations resulted in high conversions of about 90% or greater.

The dispersions prepared in Examples 11, 12, 13, and 16 were centrifuged at 2000 rpm (revolutions per minute) for one hour, after which the volume percent of supernatant liquids were determined to be 57, 52, 43, and 54, respectively. The centrifuged solids were not agglomerated or coalesced; instead, the particles prepared in the presence of 2.5 to 5.0 phm of dispersing agents were still relatively free flowing and were redispersed easily when the bottles were turned upside down and shaken slightly.

The molecular weight of the polymer prepared in Example 10 and of a sample of commercial, solution-prepared polybutadiene (Budene 1207), as a control, were determined by gel permeation chromatography. The number average molecular weight ($M_n$) was determined to be 124,000 and 132,000, while the weight average molecular weight ($M_w$) was determined to be 531,000 and 524,000, respectively. Within reproducible limits, the molecular weight and the molecular weight distribution of the polybutadiene prepared in the nonaqueous dispersion system were approximately the same as those of the commercial polymer.

EXAMPLE 18

An experiment was performed to demonstrate that the medium in which nonaqueous dispersion polymerizations have been conducted can be recycled and used again in subsequent polymerizations without the necessity for steam-stripping and distillation of that solvent. This recycling process offers a great advantage in using such nonaqueous dispersion polymerization since it eliminates the ned for steam stripping and distillation of the solvent which is generally practiced in the solution polymerization of polybutadiene.

Two 4-ounce (118 ml) bottles of nonaqueous dispersion of high cis-1,4-polybutadiene in n-pentane were prepared in the manner described in Examples 1 through 6. 2.5 phm of a mixture containing 50% by weight 3,4-polyisoprene and 50% by weight 1,4-polyisoprene was added to one bottle as the dispersing agent. Five phm of high cis-1,4-polyisoprene was added to the other bottle as the polymeric dispersing agent. These dispersions of high cis-1,4-polybutadiene were allowed to stand for four days and then they were centrifuged at 2000 rpm for one hour in order to obtain clear supernatant liquids.

A total of 75 ml of supernatant liquid was withdrawn from the bottles, using a syringe and a 3 inch hypodermic needle, and injected into another dry 4 ounce (118 ml) bottle. 13 grams of butadiene monomer were charged into the bottle and then 3.2 phm of trans-1,2-polypentadiene were injected as a dispersing agent. The catalyst employed was 2 mhm (millimoles per hundred gram of monomer) TEAL, 0.12 mhm of NiOct, and 3.4 mhm of BF$_3$.Et$_2$O. This reaction mixture was polymerized at 50° C. for 16 hours. An excellent moderately viscous nonaqueous dispersion which had a solids content of about 18 weight percent was produced. It remained as a single phase dispersion while standing at room temperature for 8 days after which time the dispersion was dried. The yield of polymer was 12.6 g (97%) and its DSV was 2.9 dl/g.

These examples prove that the organic medium used in the nonaqueous dispersion polymerization of high cis-1,4-polybutadiene can successfully be recycled. The ability to recycle such an organic medium is a very important advantage in the commercial production of high cis-1,4-polybutadiene and will result in very substantial cost savings. The energy requirements for this recycling process are very small in comparison to the energy requirements necessary for steam stripping and distillation of solvents which is usually practiced in solution polymerization of polybutadiene.

EXAMPLES 19 THROUGH 23

Aliquots of a purified butadiene in n-pentane premix containing 90 grams of butadiene per liter of solution were charged to a series of 4-ounce (118 ml) bottles. Additional liquid butadiene monomer was added from a separate bottle through a two-way stopcock equipped with hypodermic needles in increasing amounts to each of four bottles. The amount of butadiene monomer added was determined by the increase in weight. Then 2.5 phm (parts/100 g monomer) of a colloidal solution of an emulsion-prepared polydimethylbutadiene in pentane, and each of the three catalyst components, were injected "in situ" through the cap liners into each bottle of premix. The three catalyst components used were 2 mhm of TEAL, 0.075 mhm of NiOct, and 3.6 mhm of $BF_3 \cdot Bu_2O$ (boron trifluoride.dibutyl ether complex). One bottle, Example 23, containing 9 grams (g) of butadiene monomer in hexane per 100 milliliters (ml) of solution was also charged with the catalysts. The bottles and contents were placed in a 50° C. water bath and rotated end-over-end for 18 hours, except in Example 22 where only 3 hours were allowed, to polymerize the butadiene monomer. Thus, a series of nonaqueous dispersions were prepared in which the percentage of solids increased within a range from about 20 to about 30 percent by weight (Examples 19 through 22). In Example 23, a cement of polybutadiene in hexane was made which had a solids content of about 13 weight percent.

The results of these polymerizations are summarized in Table IV. The weight percent of butadiene in the premix for each of these examples is shown in Table IV and is designated as Bd Concentration. The Brookfield viscosity in centipoise (cP), the spindle used in its determination, and the speed at which the viscometer was run in RPM (revolutions per minute) are given in Table IV.

TABLE IV

| Example | Bd Concentration | Dispersion Appearance | Brookfield Viscosity cP | Spindle* | RPM | Polymer DSV |
|---|---|---|---|---|---|---|
| 19 | 27% | very good | 80 | 2 | 30 | 3.9 dl/g |
| 20 | 30% | very good | 128 | 3 | 60 | 4.2 dl/g |
| 21 | 36% | good | 920 | 4 | 60 | 4.2 dl/g |
| 22 | 39% | good | — | — | — | 4.5 dl/g |
| 23 | 14% | cement | 5100 | 4 | 60 | 3.4 dl/g |

The polydimethylbutadiene used as the dispersing agent had a microstructure which was 36% cis-1,4-, 55% trans-1,4- and 9% trans-1,2-. Brookfield viscosities were not determined in Example 22.

EXAMPLES 24 THROUGH 28

A series of experiments were conducted to prepare nonaqueous dispersions of high molecular weight, high cis-1,4-polybutadiene in pentane while using triisobutylaluminum/nickel octanoate/hydrogen fluoride.dibutyl ether catalyst systems, rather than triethylaluminum/nickel octanoate/boron trifluoride etherates, as the polymerization catalyst. The experimental procedure was the same as the one specified in Examples 1 through 6 except that an emulsion-prepared poly(2,3-dimethyl-1,3-butadiene) was used in Examples 25 and 26 as the dispersing agent; syndiotactic 1,2-polybutadiene was used in Examples 27 and 28 as the dispersing agent; and the three component catalyst system shown in Table V was employed. Example 24 was a control in which no polymeric dispersing agent was used. The premix employed in Examples 24 and 25 contained about 16.5 weight percent butadiene in pentane while Examples 26 through 28 contained about 14.4 weight percent butadiene in pentane. Table V gives the concentration of the dispersing agent used, the concentrations of the three catalyst components, the polymerization times (pzn time), the dispersion appearance, the polymer yield, and the dilute solution viscosity of the polymer synthesized.

TABLE V

| Example | Dispersant Concentration | Catalyst, mhm TIBAL | NiOct | HF.Bu2O | Pzn Time, Hours | Dispersant Appearance | Polymer Yield % | DSV dl/g |
|---|---|---|---|---|---|---|---|---|
| 24 | 0 phm | 1 | 0.075 | 2.75 | 4 | Plated Out | 87 | 4.6 |
| 25 | 3 phm | 2 | 0.075 | 5.5 | 4 | Excellent | 96 | 4.8 |
| 26 | 5 phm | 3 | 0.075 | 9.0 | 19 | Excellent | 83 | 4.1 |
| 27 | 10 phm | 1 | 0.075 | 2.75 | 19 | Good | 44 | — |
| 28 | 10 phm | 1 | 0.075 | 3.2 | 19 | Coalesced | 76 | 3.3 |

The syndiotactic 1,2-polybutadiene used in Examples 27 and 28 was Japan Synthetic Rubber's RB810 and is commercially available.

Excellent dispersions were obtained in both of the examples in which polydimethylbutadiene was utilized as the polymeric dispersing agent. There was only a trace of polymer which had settled to the bottom of the bottles in Examples 25 and 26 with about 3% clear supernatant liquid after these nonaqueous dispersions had stood for about 20 hours. A good nonaqueous dispersion (NAD) was obtained in Example 27 while using 1,2-polybutadiene as the dispersing agent, but at a 3.2.:1 mole ratio of hydrogen fluoride.dibutyl ether to triisobutylaluminum the polymer particles coalesced instead of remaining dispersed.

EXAMPLES 29 THROUGH 38

A series of experiments was conducted utilizing the experimental procedure specified in Examples 1 through 6 except that copolymers of two conjugated diolefins (butadiene and isoprene), rather than a homopolymer of a conjugated diolefin, were evaluated as the dispersing agents. The butadiene/isoprene (B/I) copolymers were prepared by three different procedures and at several different weight ratios of the monomers. The results are summarized in Table VI. The ratios of the butadiene to isoprene monomers used in the synthesis of these polymers is designated as B:I in Table VI. In Examples 29 through 32 the butadiene/isoprene copolymers were emulsion polymerized. In Examples 33 through 35 the butadiene/isoprene copolymers were solution polymerized. In Examples 36 through 38 poly(1-methyl-1,5-cyclooctadiene), which is equivalent to a perfectly alternating copolymer of butadiene and isoprene, was used as the dispersing agent. The amount of dispersant in parts per hundred parts monomer (phm) used in each of these polymerizations is also given in Table VI. The catalyst concentration used in each of these polymerizations is also given in Table VI. The polymer yield for the polymerization was not determined for Example 35. The dilute solution viscosity of the polymer produced was not determined for Examples 31, 35, 36, and 38. The amount of butadiene monomer in the butadiene/n-pentane solutions (premix) used in these polymerizations was 14.4 weight percent with the exception of Example 35 which utilized 22 weight percent butadiene monomer in the premix.

TABLE VI

| Example | Dispersant B:I | ,phm | Catalyst conc'n, phm | Dispersion Appearance | Polymer Yield, % | DSV, dl/g |
|---|---|---|---|---|---|---|
| 29 | 75:25 | 5 | 0.27 | Very good | 94 | 2.8 |
| 30 | 50:50 | 3 | 0.27 | Fair | 92 | 3.2 |
| 31 | 50:50 | 5 | 0.27 | Very good | 67 | ND |
| 32 | 25:75 | 5 | 0.75 | Good | 81 | 3.7 |
| 33 | 30:70 | 3 | 0.27 | Good | 89 | 2.5 |
| 34 | 50:50 | 5 | 0.30 | Very good | 90 | 2.2 |
| 35 | 30:70 | 3 | 0.27 | Very good | ND | ND |
| 36 | 50:50 | 5 | 0.27 | Balled up | 99 | ND |
| 37 | 50:50 | 10 | 0.41 | Fair | 99 | 2.6 |
| 38 | 50:50 | 10 | 0.54 | Balled up | 89 | ND |

Very good dispersions were prepared while utilizing 5 phm of either the emulsion or the solution polymerized copolymers as dispersing agents. The Brookfield viscosity of the dispersion prepared in Example 31 was 4 centipoises (using #1 spindle at 60 rpm) and the average diameter of the dispersed particles was 1 micrometer. On the other hand, the poly(1-methyl-1,5-cyclooctadiene) polymer produced only one fair dispersion in three experiments while using two to three times as much polymeric dispersant as was used in Examples 29 through 35.

The poly(1-methyl-1,5-cyclooctadiene) contained no discernible pendant vinyl groups according to NMR and infrared spectrographic analyses. The microstructure of the solution-prepared dispersants contained about 65% of 1,2- and 3,4-structures, while the emulsion type of copolymers contained about 12 to 16% of these vinyl type structures. The presence of pendant vinyl groups in the polymeric dispersant appears to improve its action as a polymeric dispersing agent.

EXAMPLE 39

The polymerization technique that was employed in Examples 1 through 6 was used in this example except that a butadiene/dimethylbutadiene/pentadiene terpolymer was used as the polymeric dispersing agent at a concentration of 1 phm with the polymerization being carried out for a period of 4 hours. A nuclear magnetic resonance (NMR) analysis of the terpolymer indicated that it was comprised of approximately 38 mole % 1,2-butadiene, 11% 1,4-butadiene, 8% 1,2-dimethylbutadiene, 17% 1,4-dimethylbutadiene, 20% trans-1,2-pentadiene, 5% trans-1,4-pentadiene and 1% 3,4-pentadiene units. The terpolymer had a DSV of 7 dl/g.

This terpolymer produced a fairly good NAD, but the polybutadiene particles settled gradually with the settled particles occupying 20% of the volume of the original NAD after standing for 72 hours. The DSV of the polybutadiene produced was 3.6 dl/g.

EXAMPLE 40

The same procedure that was specified in Example 39 was used in this example except that 3 phm of the terpolymer was used as the polymeric dispersing agent. An excellent NAD was produced in the presence of 3 phm of terpolymer. The polybutadiene particles remained uniformly dispersed during 72 hours that the NAD stood on a bench. The average diameter of the dispersed particles was about 4 micrometers, and the particles ranged between less than 1 to about 8 micrometers. The yield of dry polybutadiene was determined to be 85% and its DSV was found to be 3.6 dl/g.

EXAMPLES 41 THROUGH 49

A series of polymerizations were conducted employing the procedure specified in Examples 1 through 6, except that a number of polybutadienes in which the content of 1,2-polybutadiene ranged between about 1.5 and 90 percent were tried as the polymeric dispersants, with triethylaluminum, nickel octanoate and boron trifluoride dibutyl etherate being added by the "in situ" method at catalyst concentrations of 1.0, 0.075 and 1.8 mhm, respectively-except in Example 45 where the catalyst concentrations were 2.0, 0.11, and 2.8 mhm, respectively; with the polymerizations being conducted for 3 to 4 hours. The 1,2-polybutadiene content of the various polybutadienes used as dispersing agents, their number average molecular weight ($M_n$), and their DSV's are shown in Table VII.

TABLE VII

| Example | 1,2-Polybutadiene Content, % | DSV dl/g | $M_n$ |
|---|---|---|---|
| 41 | 87 | 1.2 | 120,000 |
| 42 | 82 | 1.2 | 120,000 |
| 43 | 56 | 1.5 | ND |
| 44 | 56 | 1.5 | ND |
| 45 | 56 | 1.5 | ND |
| 46 | 18 | 1.9 | ND |
| 47 | 14 | 2.0 | ND |
| 48 | 70 | ND | 2,000 |
| 49 | 2 | 0.2 | ND |

ND - Not Determined

The concentration of 1,2-polybutadiene used as the dispersing agent, the appearance of the NAD formed, the yield of the very high cis-1,4-polybutadiene produced, and the DSV of the polymer produced are given in Table VIII.

TABLE VIII

| Example | Dispersing Agent Concentration, phm | Dispersion Appearance | Yield, % | DSV, dl/g |
|---|---|---|---|---|
| 41 | 10 | Excellent | 84 | 3.0 |
| 42 | 10 | Excellent | 96 | 2.8 |
| 43 | 7.5 | Fine | 79 | 2.9 |
| 44 | 5 | Poor | 77 | ND |
| 45 | 8 | Good | 82 | 4.0 |
| 46 | 5 | Fine | 78 | 4.3 |
| 47 | 7.5 | Balled-up | 80 | ND |
| 48 | 10 | Not a NAD | 76 | ND |
| 49 | 3 | Not a NAD | 74 | ND |

ND - Not Determined

Excellent and/or fine dispersions were prepared in the presence of 7.5 and 10 phm of the polybutadiene dispersing agents containing greater than 80% 1,2-polybutadiene; 5 phm were insufficient to prepare good dispersions. The Brookfield viscosities of the dispersions prepared in Examples 41 and 42 were 4 centipoises (using #1 spingle at 30 rpm). The diameter of the dispersed particles in Examples 41 and 42, as determined with an optical microscope, ranged between 1 and 4 micrometers and averaged about 2 micrometers. The polybutadiene dispersing agents used in Examples 48 and 49 were liquids that were not useful in the formation of NAD's. This is presumably because their molecular weights were too low. These examples demonstrate the fact that atactic 1,2-polybutadiene can be employed as a dispersing agent in the nonaqueous polymerization of butadiene into very high cis-1,4-polybutadiene.

EXAMPLE 50

A polymerization was conducted using the procedure specified in Examples 1 through 6 except that 1 phm of poly(2,3-dimethyl-1,3-butadiene) was used as the polymeric dispersing agent with triethylaluminum, nickel naphthenate, and boron trifluoride dibutyl etherate being added in the mole ratio of 1:0.075:1.6 mhm, respectively, as the catalyst. The microstructure of the polydimethylbutadiene (PDMB) was 36% cis-1,4-, 55% trans-1,4-, and 9% 1,2-polydimethylbutadiene and it had a DSV of 1.3 dl/g. A fine NAD was formed and the polymerization was carried out for 4 hours at which time a theoretical yield of 90% had been achieved. The average particle size was about 4 micrometers and the DSV of the polymer produced was 4.1 dl/g.

EXAMPLE 51

The same procedure that was employed in Example 50 was used here except that 3 phm of PDMB was employed as the dispersing agent. An excellent NAD was formed with the polymerization being carried out for one hour with a yield of 87%. The polymer formed had a DSV of 3.5 dl/g and an average particle size of 1 micrometer.

EXAMPLES 52 THROUGH 56

A purified premix containing about 9 grams of 1,3-butadiene per 100 ml of solution was prepared using the procedure described in Examples 1 through 6, except that isopentane was used in these Examples as the polymerization medium rather than n-pentane and that the catalyst concentrations used were 1.0 mhm TEAL, 0.07 mhm NiOct, and 1.6 mhm $BF_3.Bu_2O$ (boron trifluoride.dibutyl ether complex). The polymer used as the dispersing agent and the amount of it added are shown in Table IX. The polymerizations were allowed to run for 3 hours.

TABLE IX

| Example | Dispersent, | phm | NAD Appearance | Yield, % |
|---|---|---|---|---|
| 52 | PDMB | 2 | Good | 88 |
| 53 | 50 Bd/50 Ip | 3 | Fair to Good | 61 |
| 54 | 25 Bd/25 Ip | 3 | Settled | 59 |
| 55 | 25 Bd/25 Ip | 5 | Settled Rapidly | 78 |
| 56 | 75 Ip/25 Sty | 3 | Not a NAD | 99 |

50 Bd/50 IP - emulsion prepared copolymer of 50% butadiene and 50% isoprene.
25 BD/75 IP - emulsion prepared copolymer of 25% butadiene and 75% isoprene.
PDMB - emulsion prepared poly(2,3-dimethylbutadiene)
75 IP/25 Sty - emulsion prepared copolymer of 75% isoprene and 25% styrene.

Fairly good dispersions were prepared in Examples 52 through 55, with the best dispersion being prepared in Example 52. Some of the particles in the other experiments coalesced and settled to the bottom of the bottles. Large sized particles, similar to a coarse powder or very fine sand were formed in Example 56. These particles settled rapdily when they were not agitated but they did not coalesce or stick to the glass and so were redispersed when agitated again.

The isoprene/styrene copolymer did not function as a dispersing agent. The polybutadiene plated out onto the glass bottle and/or balled-up forming balls of swollen sticky polymer in Example 56. The polymers produced had DSV's ranging from 3.3 dl/g to 4.2 dl/g.

EXAMPLES 57 THROUGH 60

A series of experiments were conducted in order to evaluate a number of liquid hydrocarbons as possible media in which to conduct nonaqueous dispersion polymerization of butadiene. Approximately 75 ml of each of 4 liquids, which are listed in Column 2 of Table X was poured into hot (about 120° C.) 4-ounce (118 ml) bottles; some of the liquid boiled and flushed air out of the hot bottles, which then were tightly capped and weighed. Butadiene vapor was passed through a column of Drierite ($CaSO_4$) and then was condensed in a bomb cooled in dry ice. The liquid was passed through a Luer valve and two hypodermic needles into each of the bottles which then were weighed again to determine the amount of butadiene added. Either polydimethylbutadiene (PDMB) or trans-1,2-polypentadiene (trans-1,2-polypiperylene) was injected by a syringe with a hypodermic needle through the rubber seal in the bottle caps as the dispersing agent. The catalyst components then were injected by the "in situ" method in the order triethylaluminum, nickel octanoate and boron trifluoride dibutyl etherate complex. The bottles then were tumbled end-over-end in a water bath controlled at 50° C. while the butadiene polymerized. The amount of butadiene monomer added, the dispersant used and the amount of it added, the amount of each catalyst component added, and the appearance of the NAD's formed is shown in Table X.

TABLE X

| Example | Medium | Butadiene Added, 9 | Dispersant, | phm | Catalyst, mhm | | | NAD Appearance |
|---|---|---|---|---|---|---|---|---|
| | | | | | TEAL | NiOct | $BF_3.Bu_2O$ | |
| 57 | n-pentane | 9.9 | PDMB | 1.95 | 1.5 | 0.08 | 2.4 | Excellent |
| 58 | 2-methyl-pentane | 11.1 | PDMB | 1.74 | 1.35 | 0.07 | 2.1 | Excellent |

TABLE X-continued

| Example | Medium | Butadiene Added, 9 | Dispersant, | phm | Catalyst, mhm TEAL | NiOct | BF₃.Bu₂O | NAD Appearance |
|---|---|---|---|---|---|---|---|---|
| 59 | 2,2-dimethylbutane | 12.8 | PDMB | 1.50 | 1.2 | 0.06 | 1.8 | Excellent |
| 60 | 3-methyl-1-butene | 14.9 | PPD | 3.0 | 1.3 | 0.05 | 2.4 | Very good |

PPD - trans-1,2-polypentadiene

EXAMPLES 61 THROUGH 72

A butadiene in n-pentane premix was prepared as outlined in Examples 1 through 6. A series of experiments were conducted evaluating a number of polyolefin type elastomers (ethylene-propylene-diene terpolymers, ethylene-propylene copolymers and isobutylene-isoprene copolymers) as possible dispersing agents for preparing NAD's of high cis-1,4-polybutadiene. The compositions of the polymers used as dispersing agents in this series of experiments is given in Table XI.

TABLE XI

| Polymer | Composition, wt. % Ethylene | Propylene | Diene | Mooney Viscosity ML-8 at 100° C. |
|---|---|---|---|---|
| Vistalon TM 6506 | 50 | 40 | 9.5 ENB | 80 |
| Royalene TM 301T | 65 | 28 | 6.5 DCPD | 50 |
| Nordel TM 1470 | 55 | 40 | 5.0 HD | 90 |
| Epsyn TM 55 | 55 | 35 | 5.0 ENB | 80 |
| Vistalon TM 404 | 45 | 55 | None | 40 |

ENB = 5 ethylidene-2-norbornene(2-ethylidene-bicyclo(2,2,1)-5-heptene
DCPD = dicyclopentadiene
HD = 1,4-hexadiene The Butyl copolymer used in Examples 69 and 70 had a composition of 98.5 weight percent isobutylene and 1.5 weight percent isoprene. This Butyl copolymer had a Mooney Viscosity (ML-8 at 100° C.) of 40.

The ratio of the catalyst components used in this series of polymerizations was 1.0 mhm of Et₃Al (triethylaluminum): 0.075 mhm of NiOct: 1.8 mhm of BF₃.Bu₂O. The total amount of these catalyst components used in these polymerizations is shown in column 3 of Table XII. Table XII also gives the amount of dispersant used, the polymerization time, the appearance of the NAD formed, the polymer yield, and the DSV of the polymer produced.

prepared with polyolefins as dispersants were very fluid—for example, the Brookfield viscosities of the dispersions prepared in Examples 62 and 68 were 3 centipoises—but the particles settled out of dispersion rather rapidly. The average diameter of the particles prepared in Example 68 was 4 micrometers. Dispersions were not prepared when no unsaturation was present in the polyolefin as in Examples 71 and 72.

EXAMPLE 73

A polymerization utilizing 2,2-dimethylpropane (neopentane) as the liquid nonaqueous dispersion medium was carried out. The charge employed in this polymerization was 31.1 g of 99% pure neo-pentane, 11.1 g 1,3-butadiene, 1.8 millimole/100 g Bd (mhm) of triethylaluminum, 0.07 mhm nickel octanoate, 4.7 parts/100 g Bd of a polypentadiene having a 95% cis-1,4- structural configuration, and 3.2 mhm of boron trifluoride dibutyl etherate complex. A good NAD was formed in this polymerization under these conditions. This polymerization was discontinued after 3.5 hours at 50° C. The conversion to polybutadiene was only about 34% of the theoretical, indicating that the solids content as polybutadiene in the dispersion was only about 7 percent. The dried polymer had a dilute solution viscosity of 3.6 dl/g.

EXAMPLE 74

A polymerization utilizing a butadiene/isoprene copolymer as the dispersing agent and neo-pentane as the liquid nonaqueous dispersion medium was carried out. The charge employed in this polymerization was 39 g of neo-pentane, 10.5 g butadiene, 2.4 mhm TEAL, 0.07 mhm NiOct, 3.7 phm of a block copolymer dispersant comprised of about 75% cis-1,4-polyisoprene and 25% polybutadiene, and 3.8 mhm BF₃.Bu₂O. The product after 3.5 hours was a relatively good dispersion but a few particles adhered to the bottom of the glass bottle. The conversion to solid polybutadiene was determined by drying to be 46% of the theoretical yield.

EXAMPLES 75 THROUGH 77

TABLE XII

| Example | Dispersant, | phm | Polymerization Time (hours) | Catalyst (phm) | NAD Appearance | Yield % | DSV (dl/g) |
|---|---|---|---|---|---|---|---|
| 61 | Vistalon TM 6505 | 3 | 19 | 0.26 | Fair | 76 | 3.4 |
| 62 | Vistalon TM 6505 | 5 | 17 | 0.26 | Good | 80 | 3.5 |
| 63 | Royalene TM 301T | 4.2 | 20 | 0.39 | Fair | 79 | 3.5 |
| 64 | Royalene TM 301T | 6.8 | 20 | 0.39 | Good | 74 | — |
| 65 | Nordel TM 1470 | 4.5 | 20 | 0.26 | Settled | 78 | 4.2 |
| 66 | Nordel TM 1470 | 7.2 | 20 | 0.26 | Settled | 80 | — |
| 67 | Epsyn TM 55 | 3 | 5 | 0.26 | Poor | 66 | 3.1 |
| 68 | Epsyn TM | 5 | 5 | 0.39 | Fair | 64 | 2.5 |
| 69 | Butyl | 5 | 5 | 0.26 | Not a NAD | 87 | 2.6 |
| 70 | Butyl | 8 | 3 | 0.39 | Good | 87 | 2.6 |
| 71 | Vistalon TM 404 | 5.4 | 18 | 0.26 | Not a NAD | 90 | — |
| 72 | Vistalon TM 404 | 10.8 | 2 | 0.52 | Not a NAD | 94 | — |

The amount of unsaturation in these polyolefins was quite small, even zero in Vistalon 404. The dispersions A premix solution of butadiene in n-pentane was prepared using the procedure specified in Examples 1 through 6. Piperylene/styrene copolymers, which had been prepared from a charge ratio of 85 piperylene to 15 styrene by weight using an emulsion polymerization process, were evaluated as dispersants. The ratio of catalyst components charged was 1.0 mhm $Et_3Al$: 0.05 mhm NiOct: 1.8 mhm $BF_3.Bu_2O$. In Example 75, 0.37 phm of catalyst was employed and in Examples 76 and 77, 0.50 phm of catalyst was employed. In Example 75, 5 phm of the piperylene/styrene copolymer was employed as the dispersing agent and in Examples 76 and 77, 10 phm of the piperylene/styrene copolymer was employed. After the polymerization bottles were charged they were capped and placed in a water bath at 50° C., and the butadiene was polymerized while rotating end-over-end for 19 hours. A fine NAD was produced in Example 75, an excellent NAD was produced in Example 76, and a very good NAD was produced in Example 77. The dispersant copolymer evaluated in Examples 75 and 76 had a Mooney viscosity (ML-4 @ 100° C.) of 31, while the copolymer used in Example 77 had a Mooney of 55. The DSV of the very high cis-1,4-polybutadiene produced in these examples ranged from 2.2 to 2.5 dl/g. These examples show that copolymers of styrene and 1,3-pentadiene (piperylene) can be used as dispersing agents in these nonaqueous polymerizations.

EXAMPLES 78 THROUGH 81

Nine grams of butadiene in n-pentane per 100 ml of purified premix were charged to each of four 118 ml bottles.

A colloidal suspension/solution of a moderately high trans-2,4-polyisoprene in pentane was charged as a dispersant into each bottle. The polyisoprene had been prepared using an emulsion polymerization process; its infrared analysis was 68% trans-1,4-, 21% cis-1,4-, 5% 1,2- and 6% 3,4-polyisoprene. The polymer had a Mooney viscosity (ML-4 at 100° C.) of 29. The amounts of polyisoprene added to the four bottles were 1.5, 3, 5 and 10 phm for Examples 78 through 81, respectively.

The amount of catalyst components TEAL, NiOct and $BF_3.Bu_2O$ which were injected into the first three bottles, Examples 78 through 80, were 1, 0.075 and 1.8 mhm, respectively; and 2, 0.11 and 3.6 mhm were injected into the fourth bottle (Example 81). The bottles were capped tightly, placed in a constant temperature bath at 50° C. and tumbled end-over-end. The contents in all the bottles became milky in appearance within twenty minutes, but the polybutadiene which was produced in Examples 78 through 80 in the presence of only 1.5 to 5 phm of the trans-1,4-polyisoprene dispersant coalesced during the next 30 minutes and then adhered to the glass bottle. A good stable dispersion was produced in the presence of 10 phm of trans-1,4-polyisoprene. The polymerizations were terminated after 3 hours at 50° C. by adding 1 phr of both 2,6-di-t-butyl-p-cresol and triisopropanolamine.

The Brookfield viscosity of the dispersion formed in the presence of the 10 phm of trans-1,4-polyisoprene was 3cP, determined using a #1 spindle at 30 rpm. The amount of polymer recovered after vacuum drying was 79 weight percent of the theoretical yield. The DSV of the polymer was 2.7 dl/g.

EXAMPLE 82

A premix comprised of about 13.3 g of 1,3-butadiene in 37.7 g of n-butane was charged to a dry, nitrogen flushed 118 ml bottle. Catalysts and dispersant were injected by the "in situ" method through the rubber lined cap in the following amounts and order; 1.3 mhm TEAL, 0.05 mhm NiOct, 4 phm of a 95% cis-1,4-poly(1,3-pentadiene) and 2.4 mhm $BF_3.Bu_2O$. These catalysts were added as solutions in pentane. The bottle and its contents were placed in a water bath controlled at 50° C. and tumbled end-over-end for 3.5 hours to polymerize the butadiene.

A good, milky-white, fluid dispersion containing about 19.5 weight percent of polybutadiene in butane (plus the pentane added with the catalysts) was prepared. The polymerization was terminated by adding 1 phr (part per 100 g of rubber) of both a rosin acid and a phenolic antioxidant as stabilizers. After drying under a vacuum, 13.2 g of high cis-1,4-polybutadiene was obtained.

While certain representative embodiments and details have been shown for the purpose of illustrating the invention, it will be apparent to those skilled in this art that various changes and modifications maybe made therein without departing from the scope of the invention.

What is claimed is:

1. A process for the nonaqueous dispersion polymerization of butadiene monomer in a reaction mixture containing a liquid nonaqueous dispersion medium, the improvement which comprises carrying out the polymerization of the butadiene monomer in the presence of at least one member selected from the group consisting of cis-1,4-poly(1,3-pentadiene), trans-1,4-poly(1,3-pentadiene), trans-1,2-poly(1,3-pentadiene), moderately high trans-1,4-polyisoprene, poly(2,3-dimethyl-1,3-butadiene), syndiotactic 1,2-polybutadiene, atactic 1,2-polybutadiene, butadiene/dimethylbutadiene/pentadiene terpolymers, styrene/1,3-pentadiene copolymers, EPDM rubbers, and butyl rubbers to produce very high cis-1,4-polybutadiene.

2. A process as specified in claim 1 wherein the solubility parameter of said liquid nonaqueous dispersion medium is between about 6 and about 7 $(cal/cc)^{\frac{1}{2}}$.

3. A process as specified in claim 1 wherein the amount of said moderately high trans-1,4-polyisoprene, syndiotactic 1,2-polybutadiene, atactic 1,2-polybutadiene, EPDM rubbers, and butyl rubbers present is between about 2.5 and 15 phm.

4. A process as specified in claim 3 wherein the member amount of said moderately high trans-1,4-polyisoprene, syndiotactic 1,2-polybutadiene, atactic 1,2-polybutadiene, EPDM rubbers, and butyl rubbers present is between about 5 and 10 phm.

5. A process as specified in claim 1 wherein the amount of said member selected from the group consisting of cis-1,4-poly(1,3-pentadiene), trans-1,4-poly(1,3-pentadiene), trans-1,2-poly(1,3-pentadiene), poly(2,3-dimethyl-1,3-butadiene), butadiene/dimethylbutadiene/pentadiene terpolymers and, styrene/1,3-pentadiene copolymers, present is between about 0.5 and about 15 phm.

6. A process as specified in claim 5 wherein the amount of said member selected from the group consisting of cis-1,4-poly(1,3-pentadiene), trans-1,4-poly(1,3-pentadiene), trans-1,2-poly(1,3-pentadiene), poly(2,3-dimethyl-1,3-butadiene), butadiene/dimethylbutadiene/pentadiene terpolymers and, styrene/1,3-pentadiene copolymers, present is between 1.5 and 5 phm.

7. A process as specified in claim 1 wherein said member selected from the group consisting of cis-1,4- poly(1,3-pentadiene), trans-1,4-poly(1,3-pentadiene), trans-1,2-poly(1,3-pentadiene), moderately high trans-1,4-polyisoprene, poly(2,3-dimethyl-1,3-butadiene), syndiotactic 1,2-polybutadiene, atactic 1,2-polybutadiene, butadiene/dimethylbutadiene/pentadiene terpolymers, styrene/1,3-pentadiene copolymers, EPDM rubbers, and butyl rubbers has a number average molecular weight ranging from about 50,000 to about 1,000,000.

8. A process as specified in claim 1 wherein the amount of said butadiene monomer in said reaction mixture is from about 3 to about 30 weight percent based upon the total reaction mixture.

9. A process as specified in claim 8 wherein the amount of said butadiene monomer in said reaction mixture is from 10 to 25 weight percent based upon the total reaction mixture.

10. A process as specified in claim 1 wherein said polymerization is carried out at a temperature from 0° C. to 100° C.

11. A process as specified in claim 1 wherein said polymerization is carried out at a temperature from 35° C. to 70° C.

12. A process as specified in claim 1 wherein said liquid nonaqueous dispersion medium is at least one member selected from the group consisting of butane, n-pentane, isopentane, 2-methylpentane, and 2,2,4-trimethylpentane.

13. A process for the nonaqueous dispersion polymerization of butadiene monomer in a reaction mixture containing a liquid nonaqueous dispersion medium, the improvement which comprises carrying out the polymerization of the butadiene monomer in the presence of mixtures of from 20% to 65% 3,4-polyisoprene and from 35% to 80% of a member selected from the group consisting of atactic 1,4-polyisoprene and trans-1,4-polyisoprene, to produce very high cis-1,4-polybutadiene.

14. A process as specified in claim 1 wherein the solubility parameter of said liquid nonaqueous dispersion medium is between about 6 and about 7 $(cal/cc)^{\frac{1}{2}}$, wherein the amount of said 3,4-polyisoprene and said 1,4-polyisoprene present is between about 0.5 and about 15 phm, wherein said 3,4-polyisoprene and said 1,4-polyisoprene have a number average molecular weight ranging from about 50,000 to about 1,000,000, wherein the amount of said butadiene monomer in said reaction mixture is from about 3 to about 30 weight percent based upon the total reaction mixture, and wherein said polymerization is carried out at a temperature from 0° C. to 100° C.

15. A process for the nonaqueous dispersion polymerization of butadiene monomer in a reaction mixture containing a liquid nonaqueous dispersion medium, the improvement which comprises carrying out the polymerization of the butadiene monomer in the presence of alternating copolymers of butadiene and isoprene, to produce very high cis-1,4-polybutadiene.

16. A process as specified in claim 15 wherein the solubility parameter of said liquid nonaqueous dispersion medium is between about 6 and about 7 $(cal/cc)^{\frac{1}{2}}$, wherein the amount of said copolymers of butadiene and isoprene present is between about 0.5 and about 15 phm, wherein said copolymers of butadiene and isoprene have a number average molecular weight ranging from about 50,000 to about 1,000,000, wherein the amount of said butadiene monomer in said reaction mixture is from about 3 to about 30 weight percent based upon the total reaction mixture, and wherein said polymerization is carried out at a temperature from 0° C. to 100° C.

* * * * *